US007443700B2

(12) United States Patent
Yan et al.

(10) Patent No.: US 7,443,700 B2
(45) Date of Patent: Oct. 28, 2008

(54) ON-TIME CONTROL FOR CONSTANT CURRENT MODE IN A FLYBACK POWER SUPPLY

(75) Inventors: Liang Yan, Campbell, CA (US); Junjie Zheng, Santa Clara, CA (US); John Kesterson, San Jose, CA (US); Xiaoyan Wang, Pleasanton, CA (US); Hien Bui, San Jose, CA (US)

(73) Assignee: iWatt Inc., Los Gatos, CA (US)

( * ) Notice: Subject to any disclaimer, the term of this patent is extended or adjusted under 35 U.S.C. 154(b) by 0 days.

(21) Appl. No.: 11/745,299

(22) Filed: May 7, 2007

(65) Prior Publication Data

US 2008/0112193 A1 May 15, 2008

Related U.S. Application Data

(63) Continuation-in-part of application No. 11/558,326, filed on Nov. 9, 2006.

(51) Int. Cl.
*H02M 3/335* (2006.01)

(52) U.S. Cl. ............... 363/21.01; 363/21.08; 363/21.16

(58) Field of Classification Search .............. 363/21.01, 363/21.02, 21.08, 21.09, 21.12, 21.16, 21.17, 363/23, 25; 323/283, 284
See application file for complete search history.

(56) References Cited

U.S. PATENT DOCUMENTS

| 6,166,927 | A  | * | 12/2000 | Farrington et al. | ............ 363/25 |
| 6,760,203 | B2 | * | 7/2004 | Usui | ............ 361/18 |
| 7,362,593 | B2 | * | 4/2008 | Yang et al. | ............ 363/21.16 |
| 2008/0067994 | A1 | * | 3/2008 | Kesterson et al. | ............ 323/283 |

* cited by examiner

*Primary Examiner*—Jessica Han
(74) *Attorney, Agent, or Firm*—Fenwick & West LLP

(57) ABSTRACT

A primary side sensing power control system and method for constant current control that utilizes a relationship that involves the measured reset-time from the previous cycle to determine the primary side peak current and off-time for the next cycle. This control mechanism does not need the knowledge of input voltage or magnetizing inductance. Therefore, it removes the sensitivities of input voltage and magnetizing inductance to the output current limit. Furthermore, it uses a time measurement instead of a voltage measurement for the current calculation which in many cases is easier to perform.

9 Claims, 6 Drawing Sheets

ON-TIME CONTROL FOR CONSTANT CURRENT MODE IN A FLYBACK POWER SUPPLY

RELATED APPLICATIONS

This application is a continuation in part of U.S. application Ser. No. 11/558,326 filed on Nov. 9, 2006 which is incorporated by reference herein in its entirety.

FIELD OF THE INVENTION

The present invention is related to a power supply and more particularly to pulse width modulation (PWM) and pulse frequency modulation (PFM) controllers for limiting current with primary-side sensing and feedback.

BACKGROUND OF THE INVENTION

Pulse width modulation (PWM) is a conventional technology used for controlling power converters to achieve output power, voltage, and current regulation. Conventional flyback power converters include a power stage for delivering electrical power from a power source to a load, a switch in the power stage that electrically couples or decouples the load to the power source, and a switch controller coupled to the switch for controlling the on-time and off time for the switch. The on-time ($T_{ON}$) and off-time ($T_{OFF}$) for the switch can be modified by the controller based on a feedback signal representing output power, voltage, or current. The energy is stored in the transformer core gap when the switch is on, and is transferred to the load circuit when the switch is off. Regulation can be accomplished by, among other things, measuring the output power, voltage, or current, and feeding an indicating signal back to the primary side controller, which can modify the $T_{ON}$-time and $T_{OFF}$-time of the switch accordingly to effectively regulate the output power, voltage, or current. The switching cycle $T_S$ is the sum of the on-time $T_{ON}$ and off-time $T_{OFF}$.

In power supply designs, it is necessary to regulate power, voltage, or current depending upon the application. The present invention is related to the regulation of current in a mode called "Constant Current", or (CC) mode.

One conventional power supply system involves a flyback converter that senses the output voltage directly from the secondary side of the transformer. This is called secondary sensing. FIG. 1 is an illustration of such a conventional secondary side sensing circuit.

FIG. 1 illustrates a traditional flyback power supply with secondary sensing. It is configured to regulate both voltage in constant voltage (CV) mode and current in constant current (CC) mode. The PWM controller 100 is powered by Vcc which can be derived a number of different ways from the power supply. When the PWM controller begins operation, it outputs a PWM stream to MOSFET 120, which turns on the primary current of transformer 110. As the flyback operation takes place, energy is transferred from the primary side to the secondary side of the transformer during each cycle that over time constitutes an output power to be dissipated over the load 160. As the output voltage exceeds the sum of the zener diode 140 voltage and the drop across the forward biased diode, which is part of the opto-coupler 150, the opto-coupler diode conducts, and turns on the NPN photo-transistor that is part of the same opto-coupler 150 integrated circuit. When the transistor is turned on, this draws current that causes the controller to reduce the $T_{ON}$-time. In addition, there is a current sense resistor 170 that will develop a voltage drop across the base-emitter junction of transistor 130. When the load resistance 160 is decreased such that the power supply delivers the maximum current, the transistor 130 bypasses the zener diode 140, and causes current regulation.

There are at least two significant drawbacks in cost to this solution. First, it requires the external circuit consisting of the transistor 130 and the current sense resistor 170 to aid the current regulation. The second drawback is the wasted power dissipated by the sense resistor, which reduces the overall system efficiency.

FIG. 2 is an illustration of the ideal VI curve demonstrating the desired performance where the power supply controller transitions from a Constant Voltage (CV) mode to a Constant Current (CC) mode. The shape of this curve is ideally unchanged as a function of what the $V_{IN}$ value is. In fact, this $V_{IN}$ comes from an alternating current (AC) source through a rectifier bridge and a minimal bulk capacitance.

FIG. 3 is an illustration of a conventional system. It is a primary side feedback method where the current regulation takes advantage of knowledge of the input AC voltage and the output voltage. It is the subject of U.S. Pat. No. 6,972,969 that is incorporated by reference herein in its entirety (the Shteynberg patent).

With reference to FIG. 3, a rectifier, e.g., bridge diode (BR1), receives an AC signal that typically has a voltage that ranges from 90V to 264V and outputs a rectified signal. Capacitor C1 acts as a high frequency filter for the output of the BR1 that is coupled to a primary side winding of a transformer T1. Transformer T1 includes a primary and auxiliary winding on the primary side and a secondary winding on the secondary (output) side. In this embodiment, conventional circuitry, e.g., rectifying diodes D2, D3 and filter C3, R1, R2 can be used to sense the voltage ($V_{SENSE}$) on the auxiliary winding (primary side). The direct current (DC) input voltage ($V_{INDC}$) is identified by using, for example, sense resistor R3 in combination with a low frequency filter (C2/R4). The secondary winding is coupled to an output rectifier diode D1 and output filter C0.

In a flyback type power converter that operates in discontinuous conduction mode, the output power $P_o$ can be expressed as:

$$P_o = \frac{Vin^2}{2L_M} \times \frac{t_{on}^2}{T_S} \times \eta \tag{1}$$

$$I_o = \frac{P_o}{V_o} = \frac{Vin^2}{2L_M} \frac{k}{V_o} \eta \tag{2}$$

Where $\eta$ is the power efficiency (Po/Pin), and $$k = \frac{t_{on}^2}{T_S} \tag{3}$$

For a given line voltage, the output power is directly proportional to k, which is the ratio of the square of the $T_{ON}$-time to the switching period $T_S$. This means that k is substantially a constant for a particular output voltage. Hence, the output current can be limited based upon the value of the output voltage. The current can be controlled at a constant level based upon the sensed output voltage. The on-time $T_{ON}$ and switching period $T_S$ are generated by the pulse generator 330. A conventional analog-to-digital (A/D) converter 304 generates the digital feedback voltage signal $V_{FB}$ from the $V_{SENSE}$ signal. The feedback voltage signal is directly proportional to the output voltage under any condition cycle by cycle.

The $V_{FB}$ signal is sent to the input of a conventional digital error amplifier 306, which generates an error feedback signal $V_{CM}$. In one embodiment of the present invention, the $V_{CM}$ signal is the proportional-integral (PI) function of the normal (nominal) feedback voltage level $V_{FB\_NOM}$ and the feedback voltage which represents the output voltage.

When the output current is increased, the feedback voltage $V_{FB}$ is decreased corresponding to the drop of output voltage. This results in an increase in $V_{CM}$. The error voltage signal $V_{CM}$ is received by the pulse generator 530 as the control signal $V_C$ and is used by the pulse generator 330 to control the on-time ($T_{ON}$) and the switch period $T_S$, to achieve a constant k. Thereafter, the on-time can be increased to deliver more power to output until the output voltage is within the tolerance level. The deviation of the on-time $\Delta t_{on}$ is inversely proportional to the deviation of feedback voltage $\Delta V_{FB}$. Accordingly, when the output current is less than the current limit (as represented by $V_{CM}$) this loop is a negative feedback loop.

The multiplexor is controlled by the current limit block 320 that sets the control voltage signal $V_C$ equal to the error voltage signal $V_{CM}$ when the value of the error voltage signal corresponds to the output current being less than the preset voltage signal $V_{CT}$ that corresponds to the limited output current $I_{LIM}$. Otherwise, when the output current limit exceeds its limit, $I_{LIM}$, the control voltage signal $V_C$ is set to the current limit voltage signal $V_{LT}$.

In general, the current limit voltage $V_{LT}$ is equal to the feedback voltage increased by an offset. The loop created when the output current limit is reached is a positive feedback loop. At the moment the output current reaches the limited current $I_{LIM}$, the control voltage Vc is set equal to $V_{LT}$. When the output current is increased by $\Delta I_{LMT}$, the feedback voltage decreases by $\Delta V_{FB}$. When the control voltage $V_C$ decreases the on-time is reduced. So the power requested by the increased output current is reduced which results in having the output voltage drop linearly. Therefore, the system achieves a substantially constant output current limit with varying output voltage.

As seen in Equation (4), for the given limited output power, the k which represents the on-time and the switching period is inversely proportional to the square of the RMS value of line voltage $V_{IN}$. The Line Square feed-forward block 302 of the present invention receives the DC input voltage $V_{INDC}$ and squares this signal to generate the squared feed-forward signal $V_{in}^2$ in order to permit the pulse generator 330 to account for this factor in determining the on-time $T_{ON}$ and the switch period $T_S$. The pulse generator receives the squared feed-forward signal $V_{X2}$ and the control signal $V_C$ and modifies the on-time and the switch period of the switch Q1. So it results that the energy to be delivered to the output is identified at low line and high line voltage. Consequently the limited maximum output current $I_{LIM}$ is identified.

That is, the current can then be controlled at a constant level based upon the sensed output voltage, and the square of the input voltage ($V_{IN}$).

$$t_{on}^2 = \frac{I_o 2 L_M T_S V_o}{V_{in}^2} \quad (4)$$

From this relationship, a feed-forward $V_{in}^2$ signal is used in the PWM pulse generation circuit, together with a measured $V_{SENSE}$ voltage that is a scaled representation of the output voltage, derived from the primary side auxiliary winding of the transformer. The operation of this circuit is explained in further detail within the Shteynberg patent. The feed-forward squared $V_{IN}$ can be accomplished by any number of methods, both analog or digital by those skilled in the art of design.

This method measures the output voltage by the use of an analog-to-digital circuit (ADC) 304 connected to the $V_{SENSE}$ line of the controller. The current accuracy is influenced by the external components and the turns ratio between the secondary winding and the auxiliary winding on the primary side. The multiplication of the $V_{IN}$ signal by itself is yet another complexity to the implementation. The referenced patent states that the k value which represents the on-time and the switching period is inversely proportional to the square of the RMS value of the line voltage $V_{IN}$.

What is needed is a primary side sensing power control system and method for constant current control that (1) utilizes a relationship that involves the measured reset-time from the previous cycle to determine the primary side peak current and off-time for the next cycle, where this control mechanism (2) does not need the knowledge of input voltage and (3) does not need knowledge of the magnetizing inductance. This will remove the sensitivities of input voltage and magnetizing inductance to the output current limit. Furthermore, what is needed is a primary side sensing power control system that (4) uses a time measurement instead of a voltage measurement for the current calculation.

SUMMARY OF THE INVENTION

The present invention is a primary side sensing power control system and method for constant current control. Conventional systems use of the relationship between the square of the input line voltage, and the output voltage to determine the on-time and off-time for current regulation. The present invention utilizes a relationship that involves the measured reset-time from the previous cycle to determine the primary side peak current and off-time for the next cycle. This control mechanism does not need the knowledge of input voltage or magnetizing inductance. Therefore, it removes the sensitivities of input voltage and magnetizing inductance to the output current limit. Furthermore, it uses a time measurement instead of a voltage measurement for the current calculation which in many cases is easier to perform.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
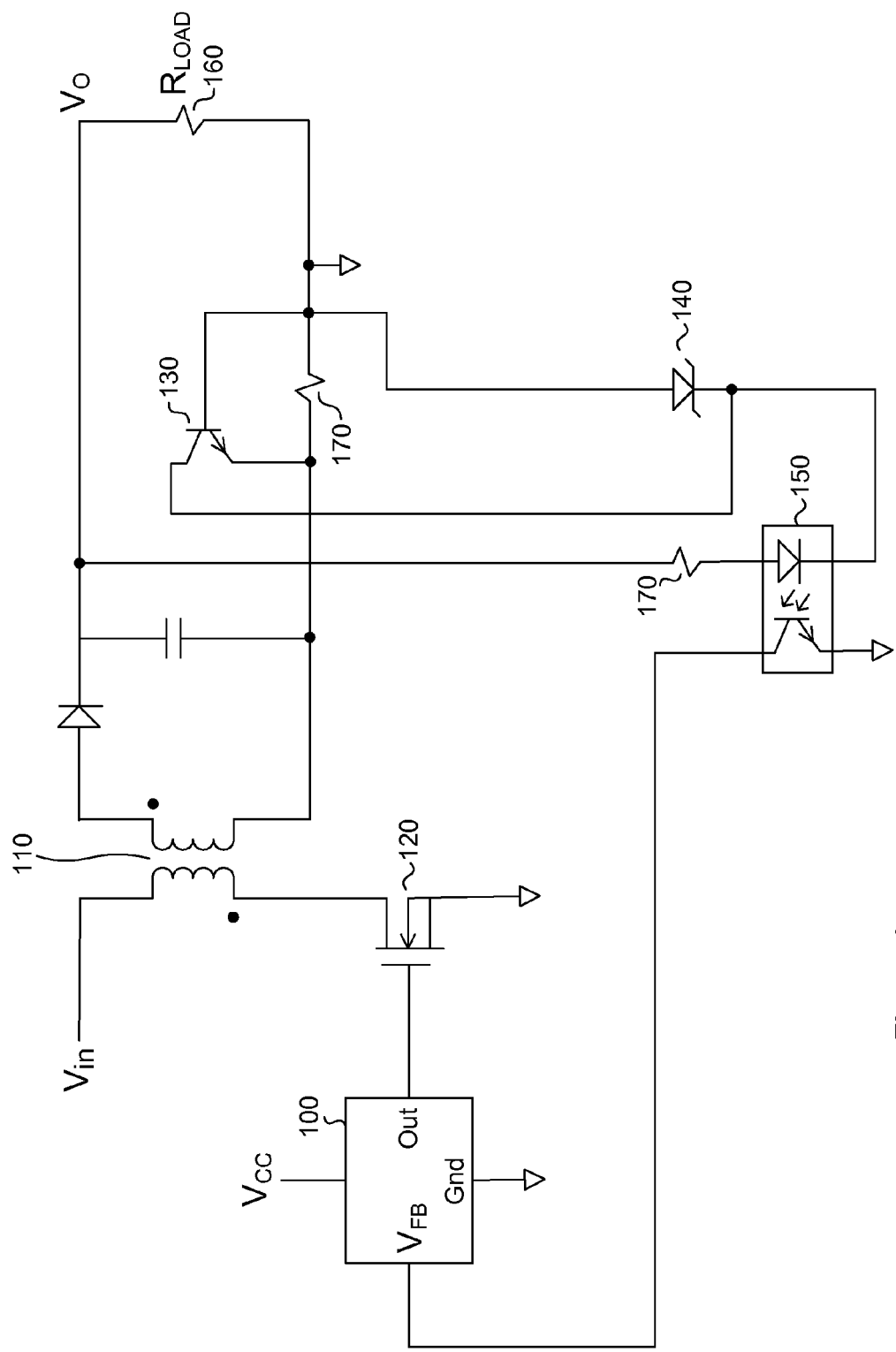
FIG. 1 is an illustration of a conventional secondary side current sensing circuit.
Figure 2:
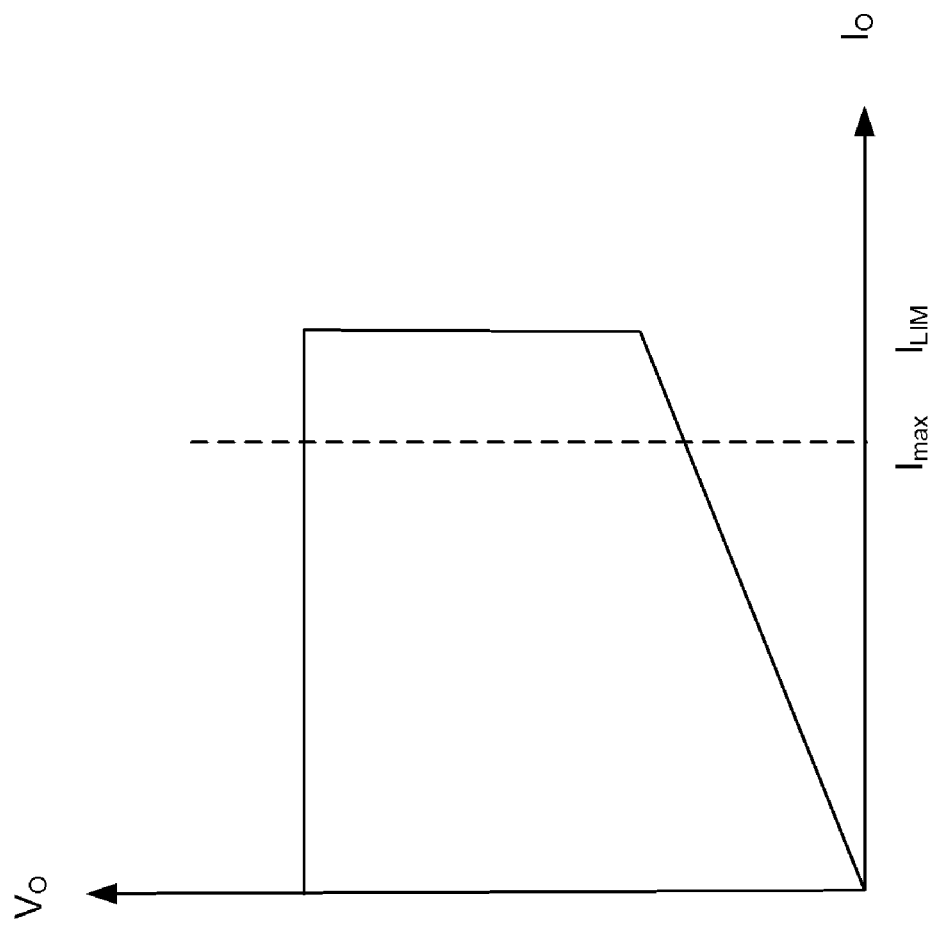
FIG. 2 is an illustration of an ideal constant current behavior in the VI curve.
Figure 3:
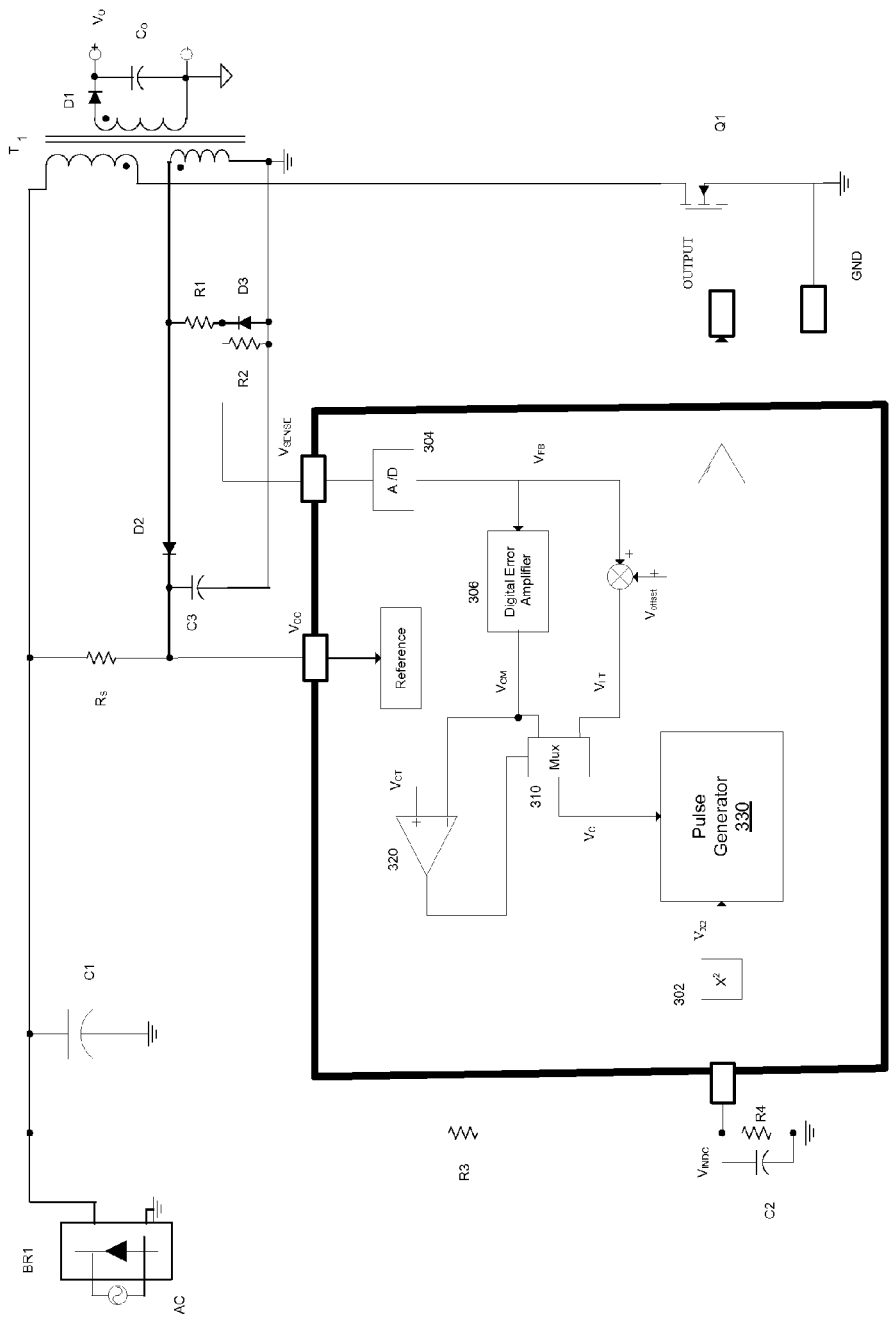
FIG. 3 is an illustration of a conventional primary side current sensing circuit.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory and/or within a logic element. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "dividing" or the like, refer to the action and processes of a logic device, collection of logic devices, computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As described above, the present invention is a system and a method that (1) controls the current limit such that it is maintained within a small range for any acceptable input voltages, e.g., 90 to 264 Volts RMS, (2) causes the output voltage of a PWM controller to drop as the output load increases so as to maintain a constant current output, and (3) does cycle by cycle calculation to determine the desired primary side peak current value. The present invention accomplishes this using primary side sensing of the reset time for each cycle of the transformer, and using this time measured result to calculate the value of primary side peak current for the operation in the next cycle. The switch period remains fixed, and a single value of primary side peak current is calculated for each cycle. A slight variation on this technique can in fact be used if a variable switch period is utilized, using the same method. Accordingly, the present invention solves the above identified goals of having a primary side sensing power control system and method for constant current control that (1) utilizes a relationship that involves the measured reset-time from the previous cycle to determine the primary side peak current and off-time for the next cycle, where this control mechanism (2) does not need the knowledge of input voltage and (3) does not need knowledge of the magnetizing inductance. The present invention removes the sensitivities of input voltage and magnetizing inductance to the output current limit. In addition the present invention (4) uses a time measurement instead of a voltage measurement for the current calculation.

In a flyback power converter that operates in discontinuous conduction mode, if the defined peak primary current is $I_{PP}$, then the output secondary peak current is:

$$I_{PS} = I_{PP} N \tag{5}$$

The value N is the turns ratio of the transformer. The average output current is:

$$I_{AS} = \frac{I_{PS}}{2} \frac{T_R}{T_S} \tag{6}$$

The value $T_R$ is the reset time for the secondary of the transformer. That is, the reset time is the duration of the current pulse on the secondary side, e.g., the time for the magnetic field of the secondary winding to collapse As described below, one measurement of this is the time duration between the trailing transition of the PWM_OUT signal from a high to a low state, and the falling edge of the transformer auxiliary voltage, as represented by $V_{SENSE}$. $T_S$ is the timer for the whole switching cycle, that is, the sum of the on-time and the off-time.

A primary current sensing resistor $R_S$ is inserted between the switching device and ground. Then, the peak voltage on the sensing resistor $V_{PP}$ is $$V_{PP} = I_{PP} R_S \tag{7}$$

Therefore, by substitution, the output average current is defined as:

$$I_{AS} = \frac{V_{PP}}{R_S} N \frac{T_R}{2 T_S} \tag{8}$$

From equation (8), the output current is proportional to the product of the peak voltage on current sensing resistor $V_{PP}$ and the reset-time $T_R$. This is the principal on which the present invention operates. Equation (9) illustrates the solving equation (8) for $V_{PP}$.

$$V_{PP} = \frac{2T_S I_{AS} R_S}{T_R N} \quad (9)$$

In the above equation, $I_{AS}$, $R_S$, $T_S$, and N are all known parameters in the application. Since they are all known values, equation (9) can be rewritten as such.

$$V_{PP}(n) = \frac{NUM\_TON\_CC}{T_R(n-1)} \quad (10)$$

In equation (10), the value NUM_TON_CC is defined:

$$NUM\_TON\_CC = \frac{2T_S I_{AS} R_S}{N} \quad (11)$$

The value for NUM_TON_CC is normalized for the units of time being worked with in the measurement of $T_R$ and the unit of voltage in the $V_{PP}$ result. Once this has been done, equation (10) can be implemented in digital hardware by a division operation. The digital result will be the input value to a DAC to generate an analog reference voltage, which determines the primary side peak current in the next cycle of switching. Note that in equation (10), the use of the variable n indicates that the new value of the DAC input is based on the (n−1) value of the measured reset-time, i.e., $T_R$(n−1). Note also that equation 10 can be solved for $T_S$ instead of $V_{PP}$, to arrive at a method for constant current control in PFM mode based on the same concept. In this mode, a new period $T_S$ is calculated each cycle based on the previous reset measurement. This accomplishes the same constant current control in a PFM environment.

Figure 4:
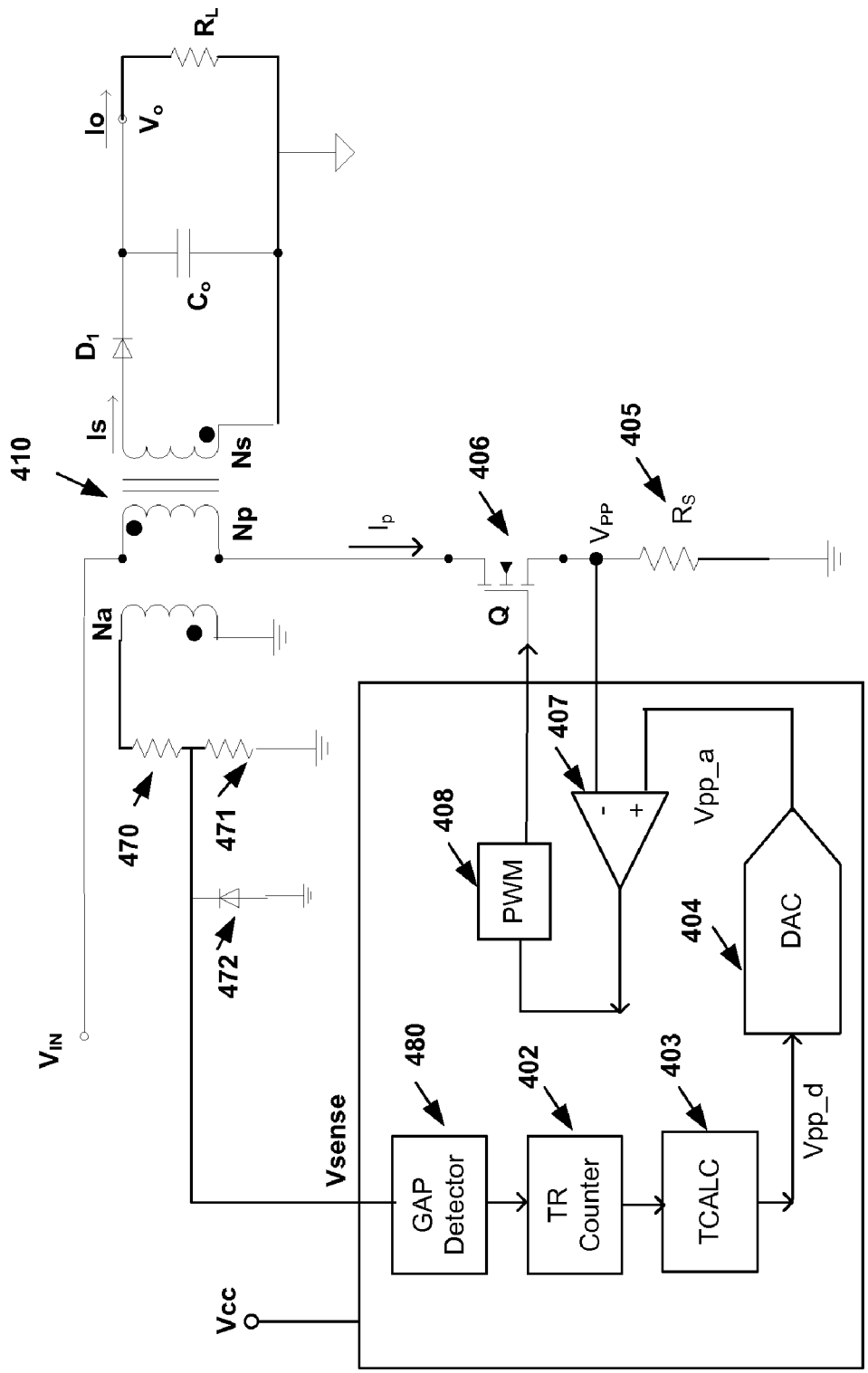
FIG. 4 is an illustration of a primary side sensing power converter circuit according to one embodiment of the present invention.

FIG. 4 is an illustration of one embodiment of the present invention. A full wave rectifier (not shown) receives an alternating current (AC) signal that is typically filtered with an input bulk capacitance that causes the $V_{IN}$ signal to appear as a large DC voltage with a ripple at twice the line frequency. The input range typically ranges from 90 to 264 Volts RMS. The signal $V_{IN}$ can therefore be as much as 375 volts DC with ripple of anywhere up to approximately 50 volts peak to peak. This DC signal is coupled to the primary winding of the transformer 410. Transformer 410 incorporates a primary and auxiliary winding on the primary side and a secondary winding on the secondary (output) side. Resistors 470, 471, and diode 472 can be used to sense the voltage ($V_{SENSE}$) on the auxiliary winding of transformer 410. A primary sensing resistor $R_S$ 405 is inserted between switching device 406 and ground to convert the primary current to voltage. A comparator 407 is used to determine if the sensed peak primary current reaches the desired reference Vpp_a.

When the sensed primary peak current exceeds the reference threshold, the comparator 407 generates a signal that is fed to a pulse width modulation (PWM) unit 408 to terminate the on state of switching device 406.

In this mode, the TCALC device 403 performs the division described above to derive the reference voltage and off-time for the next cycle. It uses the reset time from the previous cycle which was measured by $T_R$ counter 402. TCALC knows the value of NUM_TON_CC, and it receives $T_R$ from counter 402. Therefore, it is able to calculate the reference voltage on a cycle by cycle basis. If the load $R_L$ changes, the reset time $T_R$ changes accordingly and the reference voltage is adjusted on the next cycle to compensate for any load change. Therefore a constant current regulation will be sustained with a varying output voltage.

Figure 5:
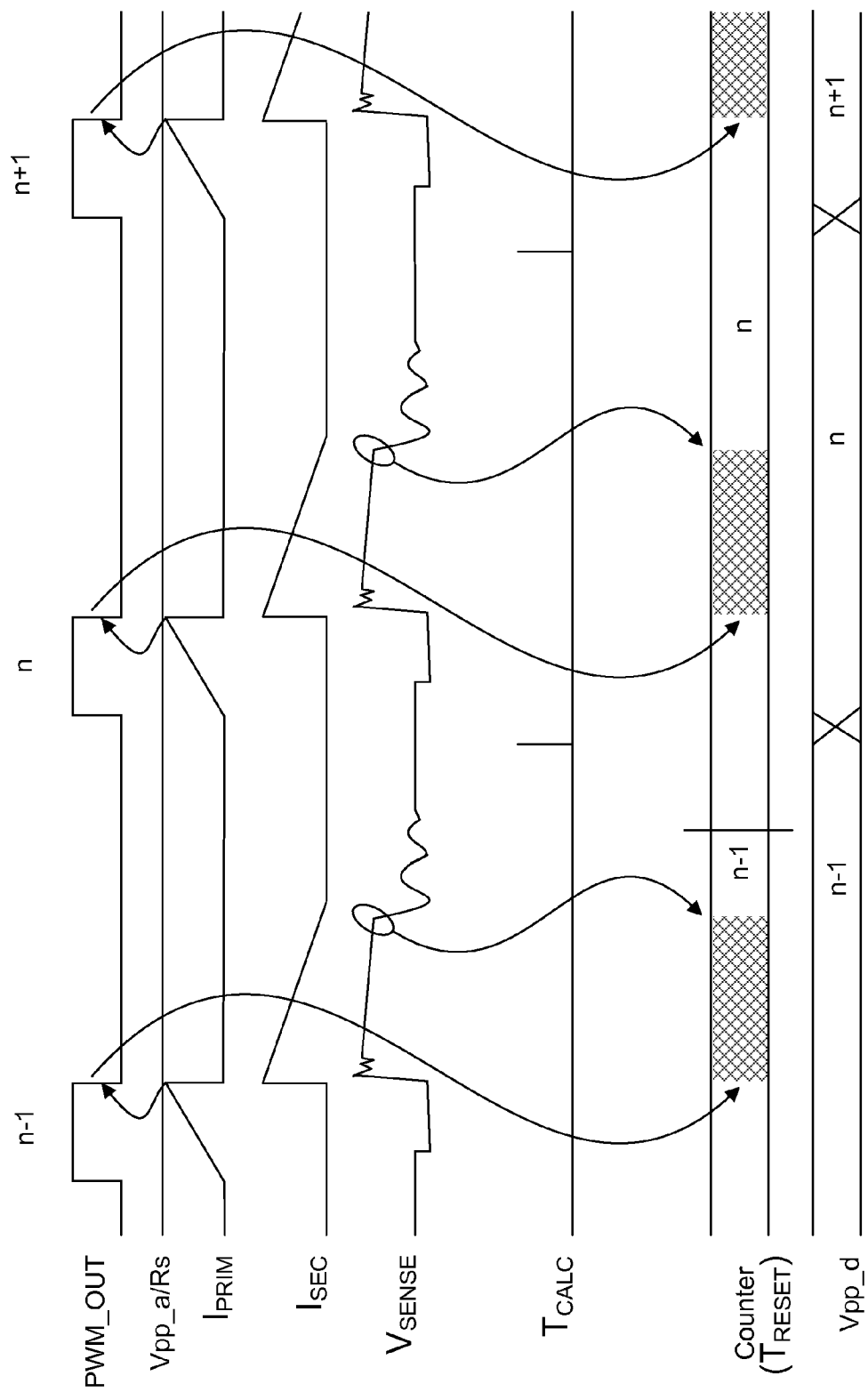
FIG. 5 is a timing diagram of the circuit illustrated in FIG. 4 in accordance with embodiments of the present invention.

FIG. 5 is a timing diagram of the circuits illustrated in FIG. 4 in accordance with embodiments of the present invention. In one embodiment counter 402 is enabled to reset and begin a new count at the falling edge of signal PWM_OUT which is the output of the PWM unit 408. The counter is stopped when a GAP detector 480 determines it has found the knee in the $V_{SENSE}$ signal. The counter 402 thus represents the digital measurement of the reset time ($T_R$). Some time after this counter 402 has stopped a pulse is generated called "Tcalc". This will cause the TCALC device 403 to perform the calculations. It will take the NUM_TON_CC and divide it by the counter value (Tr(n−1)). The result (Vpp_d) will be the input to DAC 404 for the next cycle. This result is passed to the DAC 404. DAC 404 outputs a corresponding analog voltage Vpp_a as a reference voltage for the next cycle. $V_{pp}$_a is received by the comparator 407, whose output is used by the PWM unit 408 to generate the falling edge of PWM_OUT signal in the next cycle. FIG. 5 also shows the primary side current ($I_{PRI}$) and the secondary side current ($I_{SEC}$).

Figure 6:
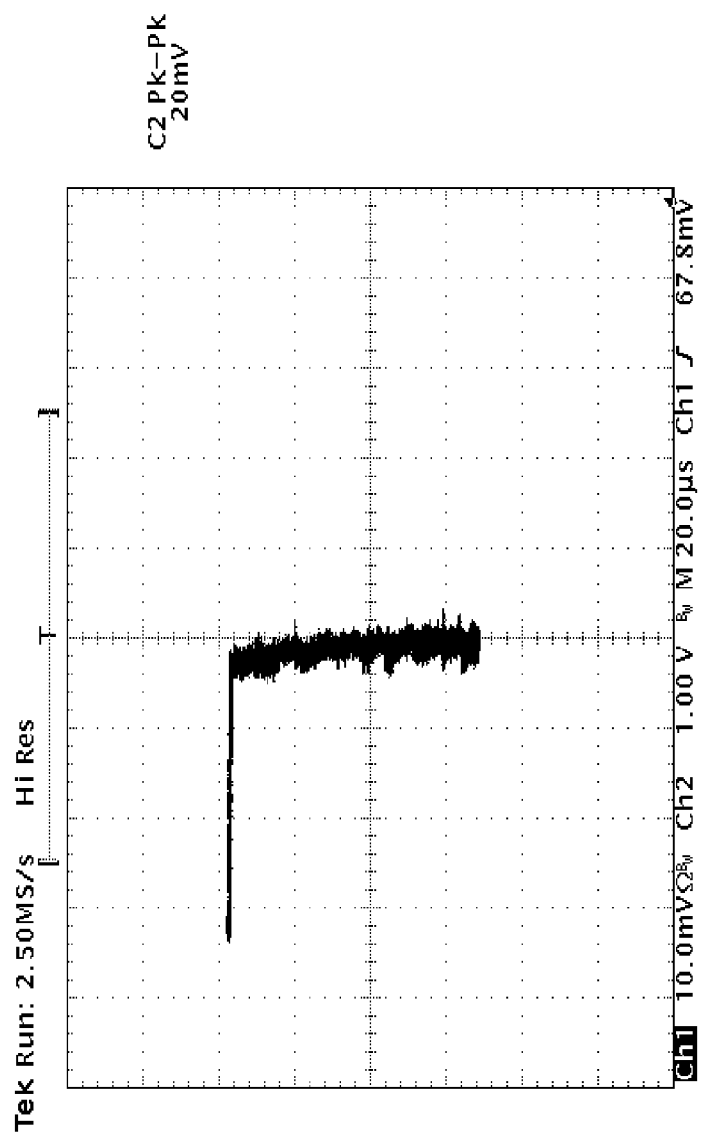
FIG. 6 is a graph showing experimental results for one embodiment of the present invention.

FIG. 6 is a graph showing experimental results for one embodiment of the present invention. The value of the output current Io varies by a small percentage over the range of input voltages of 90-264 Volts RMS, and a load change from 1 to 6 ohms at 50 mA/DIV scale.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is.

What is claimed is:

1. A method for limiting an output current of a power supply over multiple switching cycles in a constant current mode using pulse width modulation, said power supply having a primary side and a secondary side wherein an inductor, having a magnetizing inductance, electrically separates said primary and secondary sides, the method comprising the steps of:
generating a sense voltage signal on the primary side that is proportional to an output voltage signal on the secondary side;
measuring a reset time on the primary side using said sense voltage signal, said reset time representing a duration of a current pulse on the secondary side; and
generating a digital feedback voltage signal on the primary side that is used to maintain a substantially constant current on the secondary side, said digital feedback voltage signal representing the on-time for a subsequent switching cycle, wherein said digital feedback voltage signal is generated without any representation of the input voltage or any representation of the magnetizing inductance.

2. The method of claim 1, wherein said digital feedback voltage signal is based upon a comparison between a sensed peak primary side voltage signal and a target voltage signal.

3. The method of claim 2, wherein said target voltage signal is generated using said reset time.

4. A power supply control system for limiting an output current of the power supply over multiple switching cycles in a constant current mode using pulse width modulation, said power supply having a primary side and a secondary side wherein an inductor, having a magnetizing inductance, electrically separates said primary and secondary sides, the method comprising the steps of:

sense voltage means for generating a sense voltage signal on the primary side that is proportional to an output voltage signal on the secondary side;

reset determining means for measuring a reset time on the primary side using said sense voltage signal, said reset time representing a duration of a current pulse on the secondary side; and feedback means for generating a digital feedback voltage signal on the primary side that is used to maintain a substantially constant current on the secondary side, said digital feedback voltage signal representing the on-time for a subsequent switching cycle, wherein said digital feedback voltage signal is generated without any representation of the input voltage or any representation of the magnetizing inductance.

5. The system of claim 4, wherein said digital feedback voltage signal is based upon a comparison between a sensed peak primary side voltage signal and a target voltage signal.

6. The system of claim 5, wherein said target voltage signal is generated using said reset time.

7. A power supply control system for limiting an output current of the power supply over multiple switching cycles in a constant current mode using pulse width modulation, said power supply having a primary side and a secondary side wherein an inductor, having a magnetizing inductance, electrically separates said primary and secondary sides, comprising:

a sense voltage device having a winding on the primary side, to generate a sense voltage on the primary side that is proportional to an output voltage signal on the secondary side;

a counter, to determine a reset time on the primary side using said sense voltage signal, said reset time representing a duration of a current pulse on the secondary side; and a feedback device, disposed to receive said reset time, to generate a digital feedback voltage signal on the primary side that is used to maintain a substantially constant current on the secondary side, said digital feedback voltage signal representing the on-time for a subsequent switching cycle, wherein said digital feedback voltage signal is generated without any representation of the input voltage or any representation of the magnetizing inductance.

8. The system of claim 7, wherein said digital feedback voltage signal is based upon a comparison between a sensed peak primary side voltage signal and a target voltage signal.

9. The system of claim 8, wherein said target voltage signal is generated using said reset time.

* * * * *